(No Model.)
W. N. RUMELY.
TRACTION ENGINE.
No. 284,238. Patented Sept. 4, 1883.
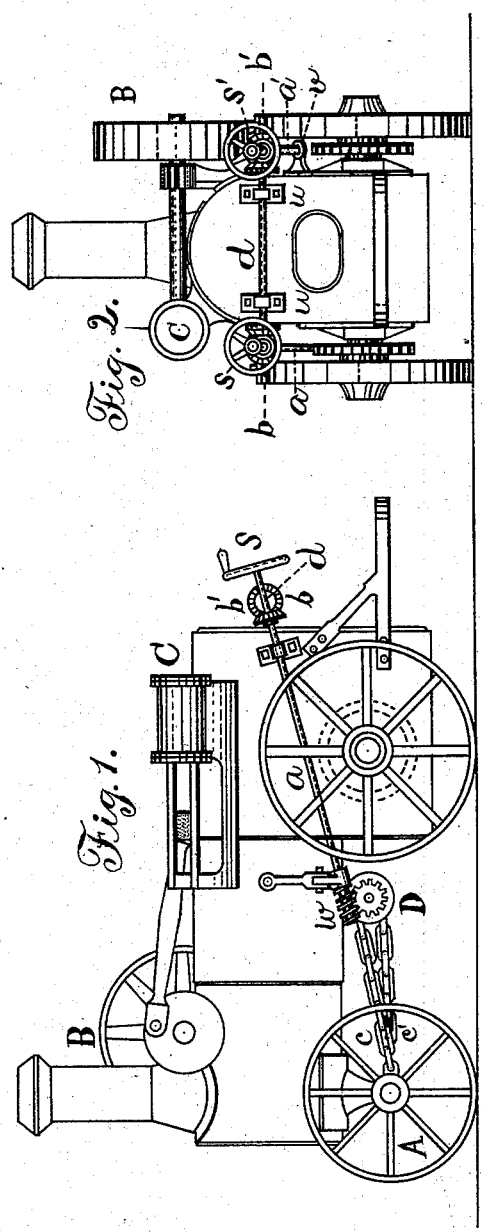
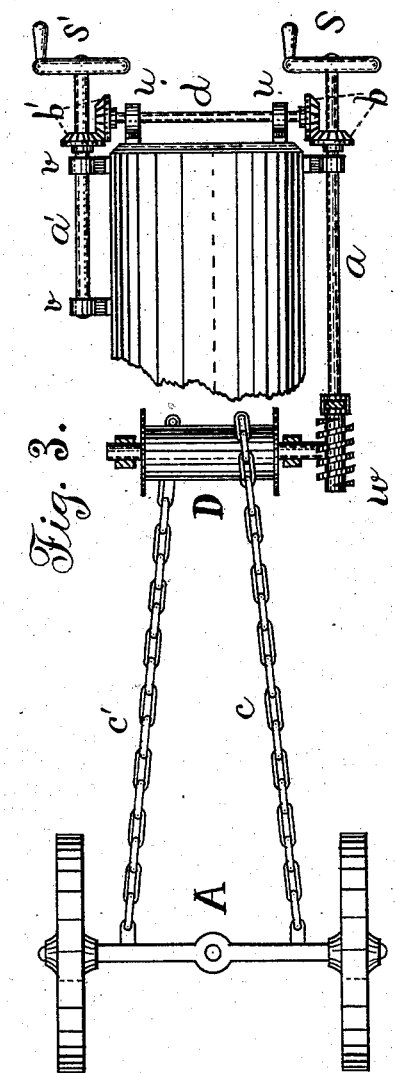
Witnesses:
Adolph Mayer
Joseph J. Rumely
Inventor:
William N. Rumely
per E. P. Robbins, M. E.
his attorney.

United States Patent Office.

WILLIAM N. RUMELY, OF LA PORTE, INDIANA.

TRACTION-ENGINE.

SPECIFICATION forming part of Letters Patent No. 284,238, dated September 4, 1883.

Application filed December 1, 1882. (No model.)

*To all whom it may concern:*

Be it known that I, WILLIAM N. RUMELY, a citizen of the United States, residing at La Porte, in the county of La Porte and State of Indiana, have invented a new and useful Improvement in Traction-Engines, of which the following is a specification.

My invention relates to improvements in the steering apparatus of traction-engines; and the object of my invention is to produce a steering device which can be worked by the engine-driver as well when he is on one side as the other of the engine or cab. With an engine which has its cylinder and engine-gear on one side and the steering-wheel on the same side, as is usually the case, the band-wheel will be on the opposite side from them. With this construction the driver can stand on the side of the cylinder when driving the engine on the road, and look ahead directly over the cylinder, while, if the steering-wheel were on the side of the band-wheel, the latter would be an obstacle in looking ahead; but such an arrangement is the source of a great deal of trouble when the driver attempts to steer the engine into position for running the thrasher—that is, into a position such that when the thrasher is located the band-wheel of the engine will be in line with the cylinder-pulley of the thrasher—for he is compelled to change to one side and the other several times in order to see and then to steer. Now, with my improved steering apparatus, which has a steering-wheel on each side, the driver can stand on the side of the cylinder, if necessary, when driving on the road, and can use either wheel independently of the other; or he can use both at once, as desirable. He can also stand on the side of the belt-wheel, and, without changing his position and by looking directly over the latter, place the engine in "belt-line" with the thrasher.

Figure 1 is a side view of a traction-engine provided with my improved steering apparatus. Fig. 2 is an end and rear view of the engine. Fig. 3 is a plan showing front axle and wheels, a portion of the rear end of the boiler, and the steering apparatus as attached thereto. For simplicity the steering-wheel shafts are shown horizontal in this figure.

A is the front axle; B, the band-wheel; C, the cylinder; D, the winding-drum. $c\ c'$ are the guide-chains. $a$ is the worm-shaft; $w$, the worm, and $s$ is the left steering-wheel. $s'$ is the right steering-wheel; $a'$, its shaft. $v\ v$ are bearings for $a'$. $d$ is a horizontal shaft, which, by means of the miter-wheels $b$ and $b'$, transmits the motion applied to either shaft to the other one. $u\ u$ are bearings for shaft $d$.

The winding-drum D, the guide-chains $c\ c'$, the worm and worm-wheel $w$, worm-shaft $a$, and the steering-wheel $s$, as shown in the figures, constitute the steering apparatus as arranged and used prior to making my improvements.

Now, I have attained the object of my invention by using a second steering-wheel, $s'$, on the shaft $a'$, and by providing for the transmission of motion from the one to the other by means of the "counter-shaft" or cross-shaft $d$ on the end of the boiler, and the miter-gears $b$ and $b'$. The shaft $a'$ is supported by means of bearings $v\ v$, attached to the side of the boiler, and the counter-shaft $d$ is supported by the bearings $u\ u$, attached to the end of the boiler.

As is evident from an inspection of the figures, the engine-driver can stand on either side of the cab, as may be desired, and can use the steering-wheel next to him, thus being able to steer his engine without any inconvenience. He can also stand near the middle of the cab and work both wheels at the same time, and thus by using both hands can apply more force and to greater advantage, and hence have a more perfect control of the engine. I have conceived of other ways of transmitting motion from the shaft $a'$ to the shaft $a$, as by means of a continuous chain of gears, by means of an endless chain passing over pulleys on the shafts $a$ and $a'$, or by the use of other wheels than the miter-wheels $b$ and $b'$ on the shafts $a$, $d$, and $a'$; but I consider the method shown in the drawings to be the best.

I claim as new and desire to secure by Letters Patent—

1. The second steering-wheel, $s'$, with its shaft $a'$, when connected with the shaft $a$ of the first steering-wheel, $s$, in such a manner as that motion imparted to the second wheel, $s'$, will be transmitted to the shaft $a$ of the first wheel, s, and hence that motion imparted to the second wheel, s', may cause a consequent motion of the winding-drum D.

2. The combination of the shaft a' of the steering-wheel s', by means of the counter-shaft or cross-shaft d and the miter-gears b and b', with the shaft a of the steering-wheel s or of the worm w, substantially as shown and described, and for the purpose set forth.

WILLIAM N. RUMELY.

Witnesses:
ADOLPH MAYER,
JOSEPH J. RUMELY.